United States Patent
Twiefel

(10) Patent No.: US 6,974,487 B2
(45) Date of Patent: Dec. 13, 2005

(54) COOLING AIR CLEANING DEVICE FOR A HARVESTING MACHINE

(75) Inventor: Herbert Twiefel, Harsewinkel (DE)

(73) Assignee: Claas Selbstfahrende Erntemaschinen GmbH, Harsewinkel (DE)

(*) Notice: Subject to any disclaimer, the term of this patent is extended or adjusted under 35 U.S.C. 154(b) by 215 days.

(21) Appl. No.: 10/455,484

(22) Filed: Jun. 5, 2003

(65) Prior Publication Data

US 2004/0003578 A1    Jan. 8, 2004

(30) Foreign Application Priority Data

Jun. 5, 2002    (DE) ................. 102 25 090

(51) Int. Cl.[7] ................. B01D 46/00; B01D 46/24

(52) U.S. Cl. ................. 55/289; 55/291; 55/295; 55/300; 55/302; 55/304; 55/385.3; 55/400; 55/428; 55/431

(58) Field of Search ................. 55/289, 290, 291, 55/295, 296, 300, 302, 304, 385.3, 428, 431, 55/400, 467

(56) References Cited

U.S. PATENT DOCUMENTS

| | | | |
|---|---|---|---|
| 3,487,623 A * | 1/1970 | Easter | 55/296 |
| 3,565,203 A * | 2/1971 | Ashton et al. | 55/385.3 |
| 4,233,040 A * | 11/1980 | Vogelaar et al. | 55/282.5 |
| 4,299,603 A * | 11/1981 | Friesen | 55/290 |
| 4,443,236 A * | 4/1984 | Peiler | 55/385.3 |
| 4,514,201 A * | 4/1985 | Brown | 55/385.3 |
| 6,193,772 B1 * | 2/2001 | Wiefel | 55/385.3 |
| 6,248,145 B1 | 6/2001 | Radke | |
| 6,432,152 B2 * | 8/2002 | Frerich | 55/385.3 |
| 6,514,303 B2 * | 2/2003 | Lukac et al. | 55/289 |

FOREIGN PATENT DOCUMENTS

DE    19836696    2/2000

* cited by examiner

Primary Examiner—Duane Smith
Assistant Examiner—Jason M. Greene
(74) Attorney, Agent, or Firm—Husch & Eppenberger, LLC; Robert C. Haldiman; Robert E. Muir

(57) ABSTRACT

A device for cleaning a perforated radiator cage with at least one end face and peripheral side on an agricultural harvesting machine, wherein the device consists of an external brush which is associated with the radiator cage and which is in turn surrounded by a unitary air extractor proximate to the radiator cage.

21 Claims, 4 Drawing Sheets

COOLING AIR CLEANING DEVICE FOR A HARVESTING MACHINE

CROSS REFERENCE TO RELATED APPLICATIONS

This application claims priority under 35 USC §119 to German Application 102 25 090.1 filed on Jun. 5, 2002.

1. Technical Field of the Invention

The present invention relates generally to agricultural harvesting machines and, more specifically, to a cooling air cleaning device for a harvesting machine.

2. Description of the Related Art

Most agricultural machines rely on substantial air cooling for their engines, drives, even air-conditioning systems. Because, however, these vehicles typically work in fairly dusty and dirty circumstances, it is necessary to filter the air before running it over or through the various heat exchangers, such as a radiator, the vehicle may have.

DE 198 36 696 C 2 and its counterpart U.S. Pat. No. 6,248,145 disclose a cleaning device for rotating cooling-air filters for removing dirt stuck to the end face and/or peripheral side by rotating brushes located in the interior of the filter. The brushes penetrate the air inlet openings of the radiator cage from the inside and remove the impurities which arise outside the radiator cage. Cleaning is assisted by an extractor fan for receiving the falling dirt particles which is located outside the radiator cage in the region of the brushes.

The disadvantage of the construction disclosed in DE 198 36 696 C 2 is that the crop particles mainly collect on the outside of the radiator cage. Brushes located on the inside of the radiator cage can of course penetrate the individual perforations of the cage but do not touch the surface in between the perforations. Consequently, the dirt sticks between the perforations, thereby persistently restricting ventilation. This is particularly relevant in damp weather conditions where stubborn and coarse dirt arises. In these weather conditions, the dirt can only be removed by direct treatment. An interior brush cannot directly treat this problem.

An additional disadvantage of the prior art is that an interior brush must precisely encounter the perforations to clean them. Precise contact is impaired by the high speed rotation and the degree of wear of the brush. This problem is increased as the brush loses its initial shape due to wear.

In yet another disadvantage of the prior art, dirt is swirled up on the inside of the cage by the brush directly in front of the radiator to be protected. The result is the heat exchanger is clogged by the dirt removed from the radiator cage, thereby defeating its purpose. Additionally, the worn bristles of the brush which no longer contact the radiator cage become clogged with dirt and contribute to the obstruction of the inner side of the radiator cage.

The present invention is directed to overcoming one or more of the problems set forth above.

SUMMARY OF THE INVENTION

It is in view of the above problems that the present invention was developed. The invention is a cooling air cleaning device having an associated rotating brush that brushes dirt and/or crop particles off the exterior of a radiator cage.

In one aspect of the invention there is provided a cooling air cleaning device including a brush, means for mounting the brush outwardly of the radiator cage and engaged with an exterior surface thereof, and means for moving the radiator cage and brush relative to each other to clean the exterior surface of the radiator cage during operation of the agricultural machine.

Advantageously, there is a first rotating brush for removing dirt from an end face of the radiator cage and a second rotating brush for removing dirt and/or crop particles from a peripheral side of the radiator cage.

In another aspect of the invention, there is provided an air extractor for removing the crop particles and/or dirt brushed off by the exterior brush or brushes.

Further features and advantages of the present invention, as well as the structure and operation of various embodiments of the present invention, are described in detail below with reference to the accompanying drawings.

BRIEF DESCRIPTIONS OF THE DRAWINGS

Reference is now being made to the drawings which illustrate the best presently known mode of carrying out the invention and wherein similar reference characters indicate the same parts throughout the views.

DETAILED DESCRIPTION

Figure 1:
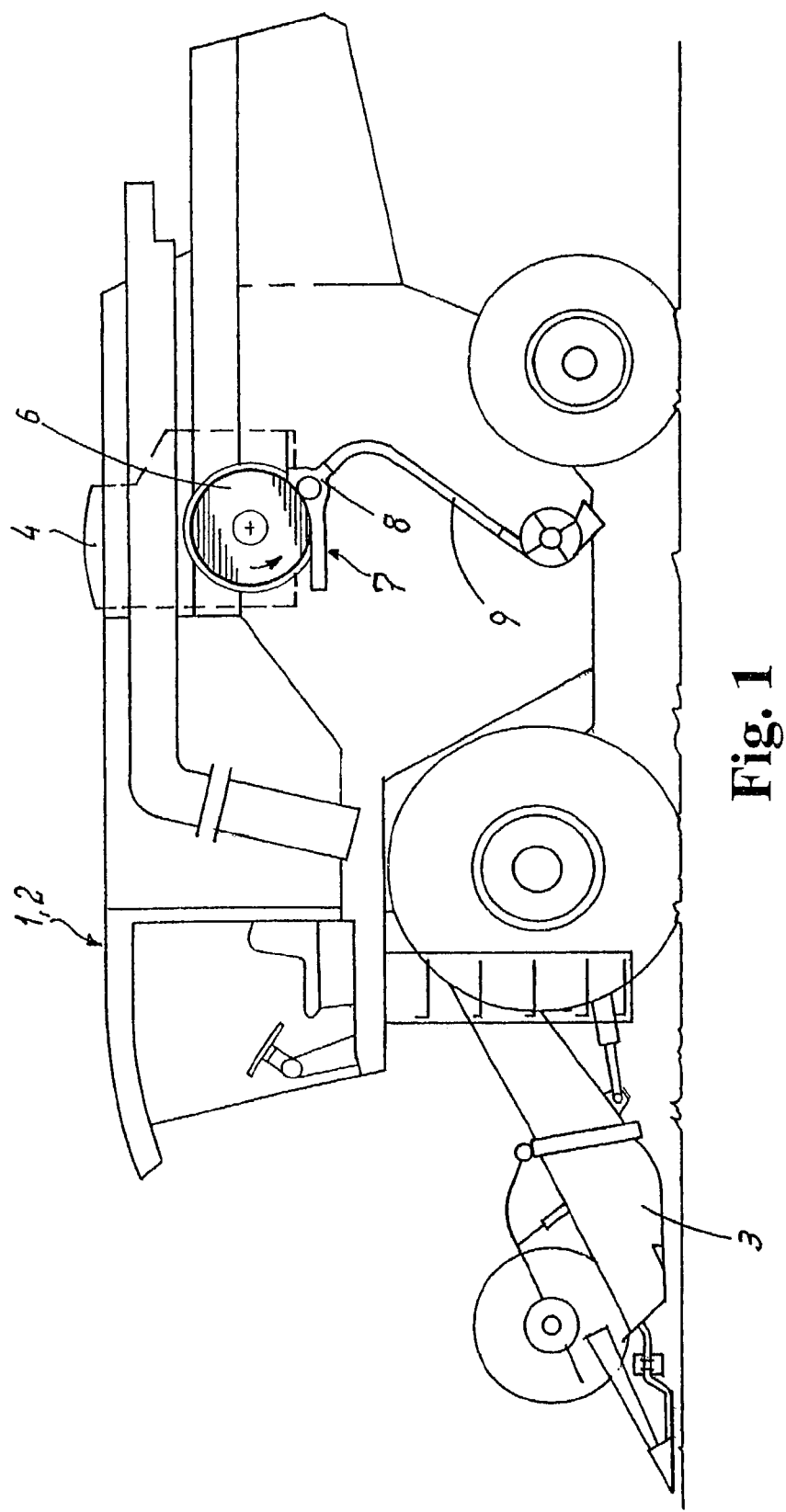
FIG. 1 is a self-propelled harvesting machine in the form of a combine harvester in the side view.
Figure 2:
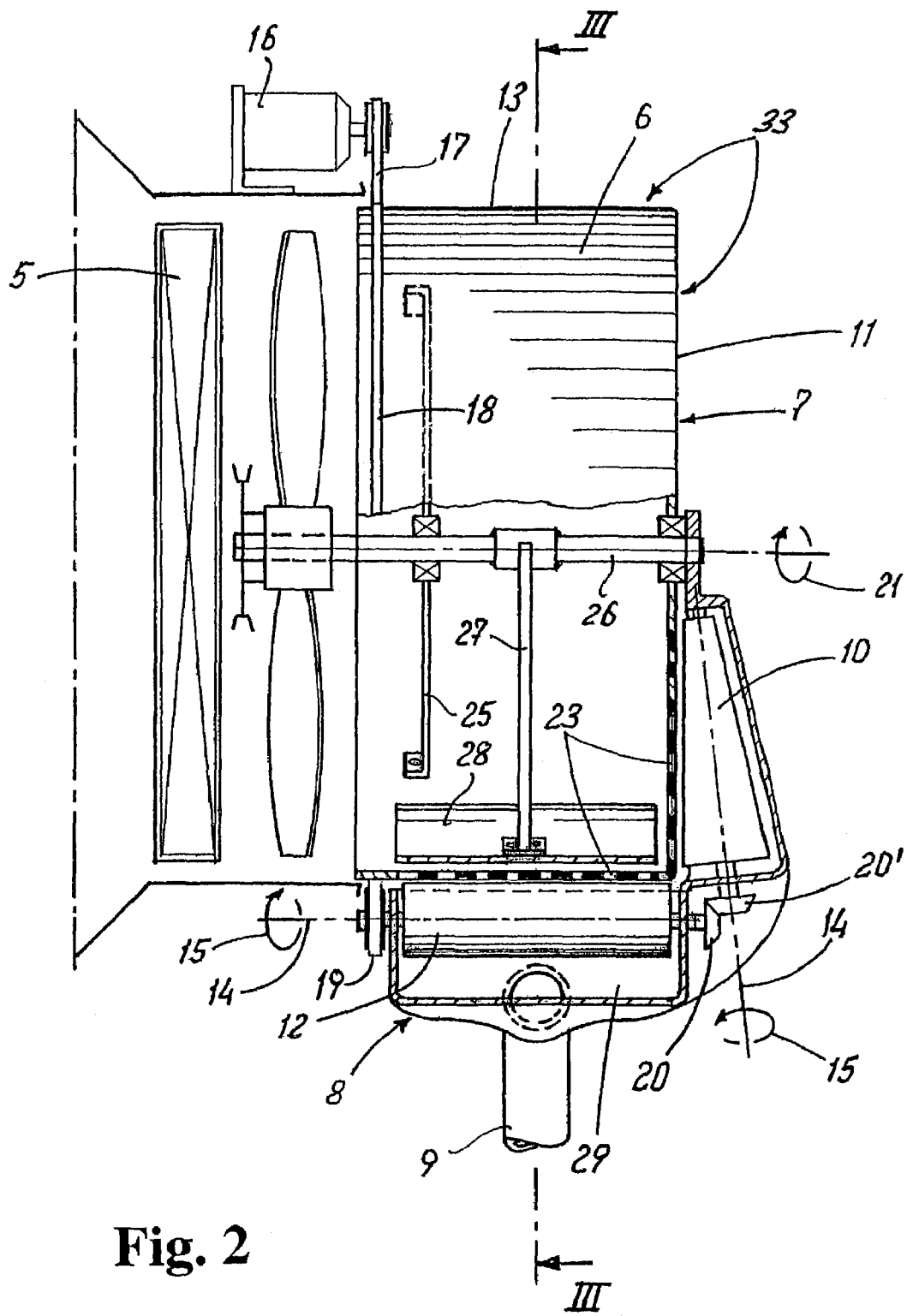
FIG. 2 is the radiator cage in a sectional view with brushes on the end face and peripheral side, and with the associated extractor fan.

An agricultural harvesting machine 1 shown in FIG. 1 is designed as a self-propelled combine harvester 2. In front of the combine harvester 2 is a cutterbar 3 by which a crop, not shown, is cut, drawn in and delivered to the agricultural harvesting machine 1. The agricultural harvesting machine 1 is driven by a drive engine 4 which is cooled by a radiator 5 (as seen in FIG. 2). The radiator 5 is located immediately behind a radiator cage 6. On the outside of the agricultural harvesting machine 1 are located a cooling-air cleaning device 7 and, surrounding the latter, an air extractor 8 whose extraction pipe 9 leads into a lower region of the agricultural harvesting machine 1 in order to transport the polluted air away out of the radiator cage region. The air extractor 8 is mounted non-rotatably, surrounds the brushes 10, 12, and opens towards the radiator cage 6. The air extractor 8 is open toward the radiator cage 6 side to directly pick up brushed off dirt and transport it through the extraction pipe 9 away from the radiator cage 6. In the depicted embodiment, the air extractor 8 is advantageously mounted below the radiator cage 6.

Swirled-up, removed dirt is taken in by the extractor 8 which surrounds each of the brushes 10, 12. The extractor 8 is a unit that carries the collected dirt away from the radiator cage 6 through the extraction hose 9. As a result, on the one hand clean cooling air is assured and on the other hand the dirt particles are carried away on a short path with little deflection.

As FIG. 2 shows, a first brush 10 is arranged on an end face 11 of the radiator cage 6. In the depicted embodiment, the first brush 10 is of conical construction. The conical brush narrows towards the center of the radiator cage 6. As a result, the conical brush adapts to the different speed of rotation from the center to the edge of the radiator cage 6.

A second brush 12 is mounted on a radial peripheral side 13. The second brush 12 has a cylindrical shape in the depicted embodiment. The second brush 12 fulfills the same function as the first brush 10 and contributes to the radiator cage 6 being cleaned over the whole of its outer surface.

Due to the external mounting of the brushes 10, 12, the crop particles and/or dirt are removed from the radiator cage 6 without the crop particles and/or dirt penetrating into the interior of the radiator cage 6. In this manner, an unimpeded performance of the subsequent components, for example the radiator 5, is achieved. The crop particles and/or dirt cannot stick to the radiator cage 6 because as soon as they come into contact with the cage, they are almost simultaneously picked up directly by the brushes 10, 12. External mounting also provides the advantage of providing easier maintenance and accessibility of the brushes 10, 12.

In the depicted embodiment, the brushes 10, 12 are of multi-part construction. Multi-part construction of the brushes 10, 12 allows for individual replacement of each brush region. Brush regions may wear independently due to different degrees of stress at different locations.

Figure 3:
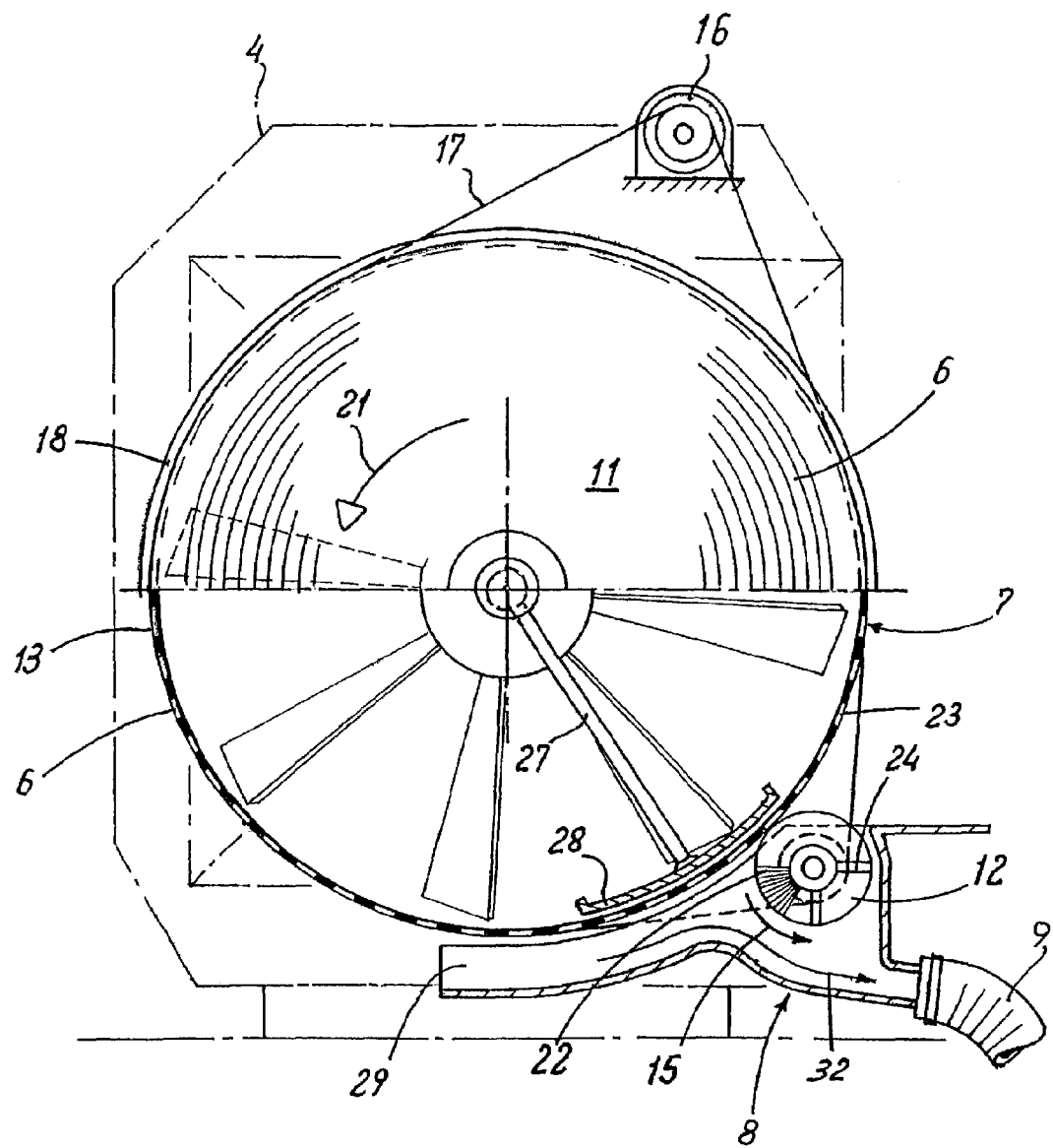
FIG. 3 is a partial sectional view along the line III—III of FIG. 2.

Each of the brushes 10, 12 consists of a plurality of bristles 22 (as seen in FIG. 3) which initially remove the dust and/or crop particles collecting on the surface of the end face 11 and peripheral side 13. Also, each of the brushes 10,12 is suitable for penetrating into the openings of the radiator cage 6 so that clogging of the radiator cage perforations is prevented. As used herein, the term "perforation" is intended to be generic to any small opening through which air flows and includes openings in a screen or mesh, or an array of openings in a housing, for example.

In a further embodiment, the number of brushes can be reduced to one brush. This is particularly true with a low occurrence of dirt particles and low cooling air requirements such that the radiator cage 6 does not require increased cleaning. As a result, corresponding cost savings are achieved.

The brushes 10, 12 can be driven actively or passively. In the depicted embodiment, the brushes 10, 12 are rotated about their brush axles 14 in direction 15 opposite to the direction 21 of the rotating radiator cage 6. Rotating the brushes 10, 12 and the rotating cage 6 in opposite directions to each other increases the intensity and thoroughness of cleaning. Also, on account of the high circumferential speed in connection with rotation in opposite directions, the individual dirt particles are removed from the radiator cage surface and carried directly into the extraction opening.

Driving is effected by means of a drive motor 16 which sets in motion a drive belt 17. The drive belt 17 runs over a belt guide 18 mounted on the outer peripheral side 13 of the radiator cage 6 and over a pulley 19 located in a line with the belt guide 18. The pulley 19 is located at an outer end of the second brush 12. Due to this configuration, both the radiator cage 6 and the second brush 12 are driven. Due to the fact that the brushes 10, 12 are driven actively, constant cleaning of the radiator cage 6 is made possible, preventing the brushes from slipping on account of adverse harvesting conditions. However, a cheaper variant in the form of passive driving the brushes is also possible.

The brushes 10, 12 are in driving engagement with each other. In the depicted embodiment, bevel gears 20, 20' connect both the second brush 12 and the first brush 10 to each other. Overall, the brushes 10, 12 and the radiator cage 6 rotate in opposite directions, as the arrow directions 15, 21 in FIG. 3 show. The brushes 10, 12 are stationary in relation to the radiator cage 6. However, in other embodiments, the radiator cage 6 can be mounted stationary and the brushes 10, 12 in rotating relationship to the radiator cage 6.

FIG. 3 shows a partial section of the radiator cage 6 in a front view. The plurality of individual bristles 22 of the brushes 10, 12 removes the dirt lying directly on the end face 11 and peripheral side 13. The bristles 22 additionally penetrate through a plurality of individual perforation holes 23 of the radiator cage 6. A plurality of plastic paddles 24 can be mounted between the plurality of bristles 22. The quality of cage surface cleaning is additionally increased by the intermediately mounted plastic paddles 24 which, particularly in damp weather conditions, wipe the wet dirt particles thoroughly off the radiator cage surface.

The radiator cage 6 is supported by individual spokes 25 (as seen in FIG. 2) which start from a supporting shaft 26 located at the center of the radiator cage 6 and are rigidly connected to the inside of the peripheral side 13. Also starting from the supporting shaft 26 is a supporting arm 27. An inner shield plate 28 is operatively mounted to one end of the supporting arm 27 immediately in front of the inner surface of the peripheral side 13. The inner shield plate 28 is adapted to the radial shape of the peripheral side 13 and located in the immediate vicinity of an air conducting channel 29, the brushes 10, 12, and the air extractor 8. The shield plate 28 is located on the inside of the radiator cage 6. The air conducting channel 29 is connected to the cooling air cleaning device 7 and closely encompasses, in a U-shape fashion, a portion of the peripheral side 13 of the rotating radiator cage 6 without touching it.

In the depicted embodiment, the direction 21 of the radiator cage 6 is the same as a direction 32 of the exiting airflow. By removing the dirt in the direction of rotation of the rotating radiator cage 6, the exiting air has additional conveying which improves the air stream produced for better cleaning and reducing the resistance of the dirt to flow.

Figure 4:
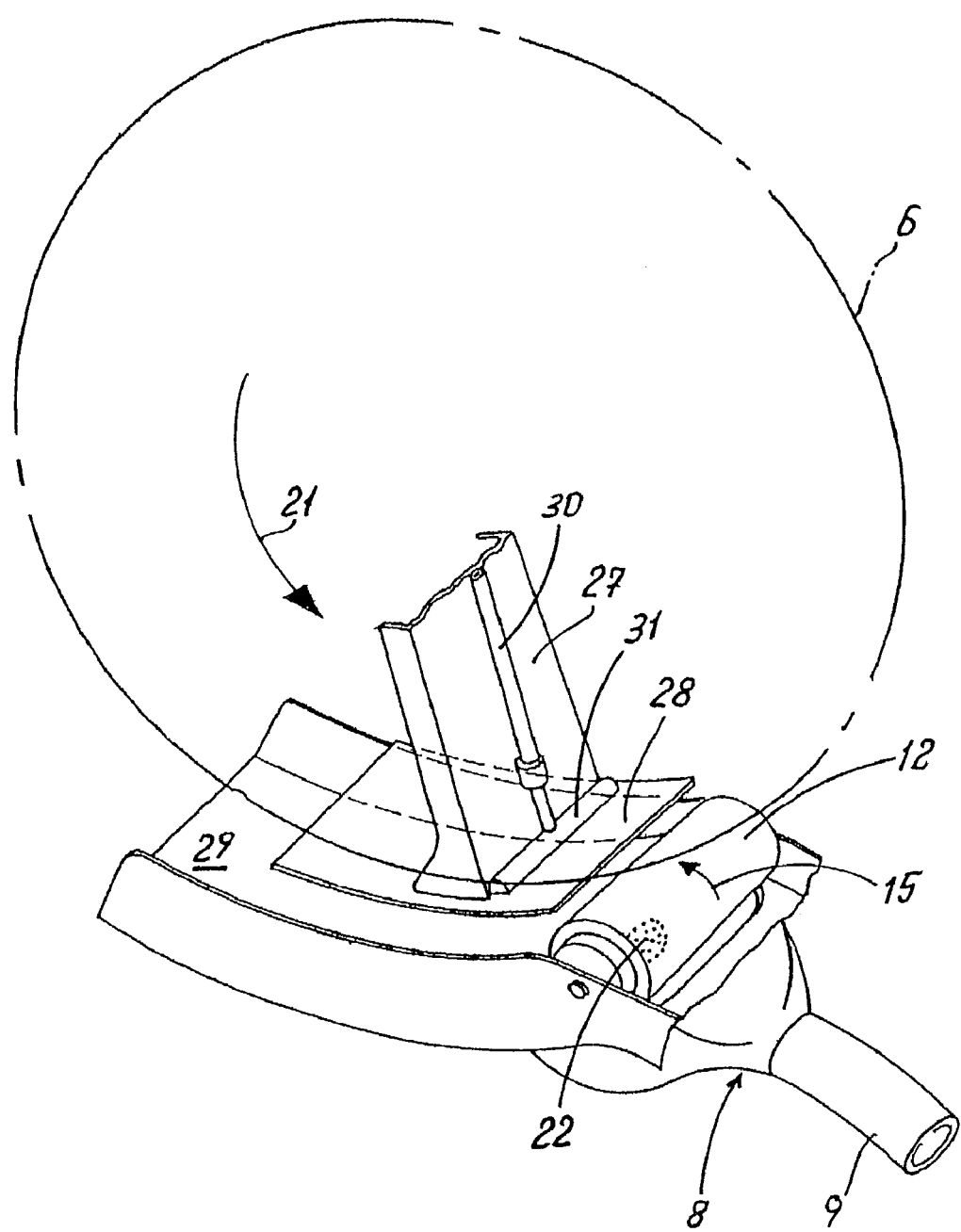
FIG. 4 is a detailed view of the extractor with associated compressed air nozzle on the inside.

FIG. 4 shows as a detail the extractor 8 and the shield plate 28 with its supporting arm 27. Starting from the center of the radiator cage 6, from the supporting shaft 26 along the supporting arm 27 runs an air pipe 30 whose end is connected to a compressed air nozzle 31 which is in turn connected to the shield plate 28. The compressed air nozzle 31 extends almost over the whole width of the shield plate 28. The compressed air nozzle 31 comprises a slot-like opening for blowing compressed air across the inner surfaces of the radiator cage 6. The compressed air nozzle 31 is arranged in the interior of the radiator cage in the immediate region of the brushes 10, 12. The compressed air source opposite the air extractor 8 greatly assists the detachment and extraction of dirt and/or crop particles from the screen surface of the radiator cage 6. The compressed air can be actuated continuously or as required in order to keep free the radiator cage openings. The compressed air nozzle 31 is thus, like the shield plate 28, arranged immediately in front of the interior of the peripheral side 13 of the radiator cage 6 in the immediate vicinity and opposite the air conducting channel 29.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and operations herein described and illustrated without departing from the scope of the invention, it is intended that all matter contained in the foregoing description or shown in the accompanying drawings shall be interpreted as illustrative rather than limiting. For example, while only two brushes are shown, a plurality of brushes could be equally used. Thus, the breadth and scope of the present invention should not be limited by any of the above-described exemplary embodiments, but should be defined only in accordance with the following claims appended hereto and their equivalents.

What is claimed is:

1. A cooling air cleaning device for an agricultural harvesting machine including a radiator and a perforated radiator cage adjacent the radiator, the radiator cage having an interior and an exterior and arranged so that cooling air flows from the exterior to the interior and therefrom to the radiator, the cleaning device, comprising:
 a first brush operatively connected to an end face of said radiator cage, and a second brush operatively connected to a peripheral side of said radiator cage; and
 a driver, said driver moving the radiator cage and at least one of said first brush or said second brush relative to said radiator cage to clean the exterior surface of said radiator cage during operation of the agricultural machine.

2. A cooling air cleaning device for an agricultural harvesting machine including a radiator and a perforated radiator cage adjacent the radiator, the radiator cage having an interior and an exterior and arranged so that cooling air flows from the exterior to the interior and therefrom to the radiator, the cleaning device, comprising:
 a brush, the brush being mounted outwardly of the radiator cage and engaged with an exterior surface thereof;
 a driver, said driver moving the radiator cage and brush relative to each other to clean the exterior surface of the radiator cage during operation of the agricultural machine; and an air extractor partially surrounding the rotating brush and operatively mounted to the agricultural harvesting machine.

3. The cooling air cleaning device according to claim 1, wherein said first brush and said second brush are in driving engagement with each other.

4. The cooling air cleaning device according to claim 3, wherein the brushes and the radiator cage rotate in opposite directions to each other.

5. The cooling air cleaning device according to claim 1, wherein a direction of rotation of the radiator cage runs in a direction of extraction.

6. The cooling air cleaning device according to claim 1, wherein the brush rotates about an axis that is stationary in relation to the radiator cage.

7. The cooling air cleaning device according to claim 6, wherein the rotating brush is driven actively.

8. The cooling air cleaning device according to claim 1, wherein the brush includes a plurality of individual bristles that are capable of penetrating the perforations of the radiator cage.

9. The cooling air cleaning device according to claim 1, wherein the brush is of multi-part construction.

10. The cooling air cleaning device according to claim 2, wherein the air extractor is open towards the radiator cage and directly receives an object removed from the radiator cage.

11. The cooling air cleaning device according to claim 2, wherein the air extractor forms a unitary continuous housing.

12. The cooling air cleaning device according to claim 2 wherein the air extractor is a unitary structure that substantially surrounds the brushes.

13. The cooling air cleaning device according to claim 2, wherein the air extractor is stationary in relation to the radiator cage.

14. The cooling air cleaning device according to claim 2, wherein the air extractor converges to an extraction pipe for carrying a plurality of objects away from the radiator cage into a lower region of the agricultural harvesting machine.

15. The cooling air cleaning device according to claim 1, further comprising an air pipe located in the interior of the radiator cage for blowing air through the perforations.

16. The cooling air cleaning device according to claim 1, further comprising a paddle arranged within the brush.

17. The cooling air cleaning device according to claim 1, wherein the first brush is conical and the second brush is cylindrical.

18. The cooling air cleaning device according to claim 3, wherein each brush includes a bevel gear and the bevel gears are operatively engaged with one another.

19. The cooling air cleaning device according to claim 2, further comprising a shield plate operatively mounted in the interior of the radiator cage and opposite of the air extractor.

20. The cooling air cleaning device according to claim 15, further comprising an air nozzle operatively connected to the air pipe.

21. A cooling air cleaning device for an agricultural harvesting machine including a radiator and a perforated radiator cage adjacent the radiator, the radiator cage having an interior and an exterior and arranged so that cooling air flows from the exterior to the interior and therefrom to the radiator, the cleaning device, comprising:
 a first rotating brush operatively engaged with an exterior end face of the radiator cage and operatively mounted to the agricultural harvesting machine; and
 a second rotating brush operatively engaged with a peripheral exterior side of the radiator cage and operatively mounted to the agricultural harvesting machine.

* * * * *